United States Patent [19]

Morinaga et al.

[11] 4,336,475
[45] Jun. 22, 1982

[54] SLOTLESS BRUSHLESS MOTOR

[75] Inventors: Shigeki Morinaga; Kunio Miyashita; Tadashi Takahashi; Takeo Maeda, all of Hitachi; Seizi Yamashita, Katsuta, all of Japan

[73] Assignee: Hitachi, Ltd., Tokyo, Japan

[21] Appl. No.: 66,767

[22] Filed: Aug. 14, 1979

[30] Foreign Application Priority Data

Aug. 14, 1978 [JP] Japan ................. 53/98150

[51] Int. Cl.³ ............................................. H02K 3/00
[52] U.S. Cl. ................................... 310/198; 310/45; 310/156; 310/184; 310/268; 336/205
[58] Field of Search ................. 310/156, 268, 46, 179, 310/112, 68 R, 45, 43, 180, 184, 198, 203–206, 208, 71, 194, 214, 258; 336/205, 206

[56] References Cited

U.S. PATENT DOCUMENTS

| | | | |
|---|---|---|---|
| 3,569,753 | 3/1971 | Babikyan | 310/268 |
| 3,599,325 | 8/1971 | Burr | 310/268 |
| 3,790,835 | 2/1974 | Takeda | 310/268 |
| 3,825,774 | 7/1974 | van Kessel et al. | 307/313 X |
| 3,845,339 | 10/1974 | Merkle | 310/268 |
| 3,909,628 | 9/1975 | Muto | 323/315 X |
| 3,912,956 | 10/1975 | Muller | 310/268 |
| 4,004,247 | 1/1977 | van de Plassche | 323/315 X |
| 4,109,170 | 8/1978 | Fujita | 310/268 |
| 4,117,519 | 9/1978 | Shioyama | 310/268 |
| 4,122,403 | 10/1978 | Cave | 330/296 X |
| 4,125,792 | 11/1978 | Schmider | 310/268 |
| 4,174,484 | 11/1979 | Schmider | 310/268 |
| 4,268,759 | 5/1981 | Gilbert | 307/310 X |

OTHER PUBLICATIONS

McClellan, "Current Source and 555 Timer Make Linear V-to-F Converter", Electronics, Jun. 10, 1976, pp. 108, 109.

*Primary Examiner*—R. Skudy
*Attorney, Agent, or Firm*—Craig and Antonelli

[57] ABSTRACT

The present invention relates to a slotless, brushless motor comprising a permanent magnet rotor rotationary together with a shaft and a stationary armature coil disposed in opposition to the rotor.

The armature coil comprises a coil portion concentrically wound, an adjacent coil portion formed in sequence from the coil portion and concentrically wound, a coil performed on a plane by a plurality of the coil portions, N coils (N is integer) laid on each other and different in a phase respectively, sheets disposed between said N coils and a supporting member supporting the coils and the sheets made integral.

12 Claims, 3 Drawing Figures

SLOTLESS BRUSHLESS MOTOR

BACKGROUND OF THE INVENTION

The present invention relates to a slotless, brushless motor, and more especially to a driving motor which is directly connected to and used for a rotary drum of a video tape recorder (VTR).

Until now, a slotless, brushless motor has comprised a flat rotor made of a permanent magnet integrally connected with a rotary shaft, and a stator having an armature rotor in parallel to the flat rotor.

When slots are formed on the core, cogging occurs because magnetism changes at the slots during rotation. The slotless core can prevent the occurrence of cogging as well as reducing the wow flutter phenomenon of a motor.

Referring to motors employing slotless cores, U.S. Pat. No. 3,599,325 and Japanese Patent Application Laid Open No. 53-55007 are known. With these motors, permanent magnets on which eight poles are magnetized in the direction of the surface are used. Corresponding to this structure, stators manufactured by forming armature windings of three phases on flat magnetic bodies are used. According to these structures, the wiring is complicated due to the formation of armature windings of three phases on one plane and the wiring of the take-out leads is also complicated. As a result, the method for production of such an armature is complicated.

In addition, these structures fail to provide a satisfactory stability of rotation because the feed of current must be switched in turn to the armature windings of the three phases formed on the same plane.

SUMMARY OF THE INVENTION

One object of the present invention is to provide a motor in which the structure of the armature windings is made simpler and the stability of rotation is heightened.

Another object of the present invention is to provide a motor which uses a permanent magnet with a simple structure.

Another object of the present invention is to provide a motor in which the rotatory force is constantly generated over the whole surface of the permanent magnet rotor and the stator of the armature coil, so that the stability of rotation is heightened.

One characteristic of the present is in the provision of an armature coil in which the coil portion is formed by a concentric winding, the next coil portion is also formed by a concentric winding in sequence from the first coil portion, one coil is formed by using a plurality of the coil portions formed as above mentioned, N coils (N is integer) are laid on each other to provide different phases, and at that time isolation members, for example, an adhesive sheet, are provided between the coils, after which these coils and isolation members are integrated into a unitary structure. It is preferable to employ a heat-adherence treatment under pressure for performing its integration.

The coils integrated with the isolation members are also mounted on a yoke iron plate. Terminals of the respective coils are placed in parallel in the same direction to take out electrical leads, and the taken-out leads are connected to a terminal plate.

For example, according to one embodiment of the present invention, the following motor is provided:

A slotless, brushless motor comprising:
a shaft,
a permanent magnet rotor integrally rotating together with the shaft,
a stator of armature coil disposed in opposition to the permanent magnet rotor,
the armature coil comprising,
a coil portion concentrically wound,
an adjacent coil portion formed in sequence from the coil portion and concentrically wound,
one coil performed on a plane by arranging a plurality of the coil portions,
N coils (N is integer) laid on each other and different in a phase respectively,
sheets disposed respectively between the coils, and
a member to support integrated coils and sheets.

DETAILED DESCRIPTION OF THE INVENTION

Figure 1:
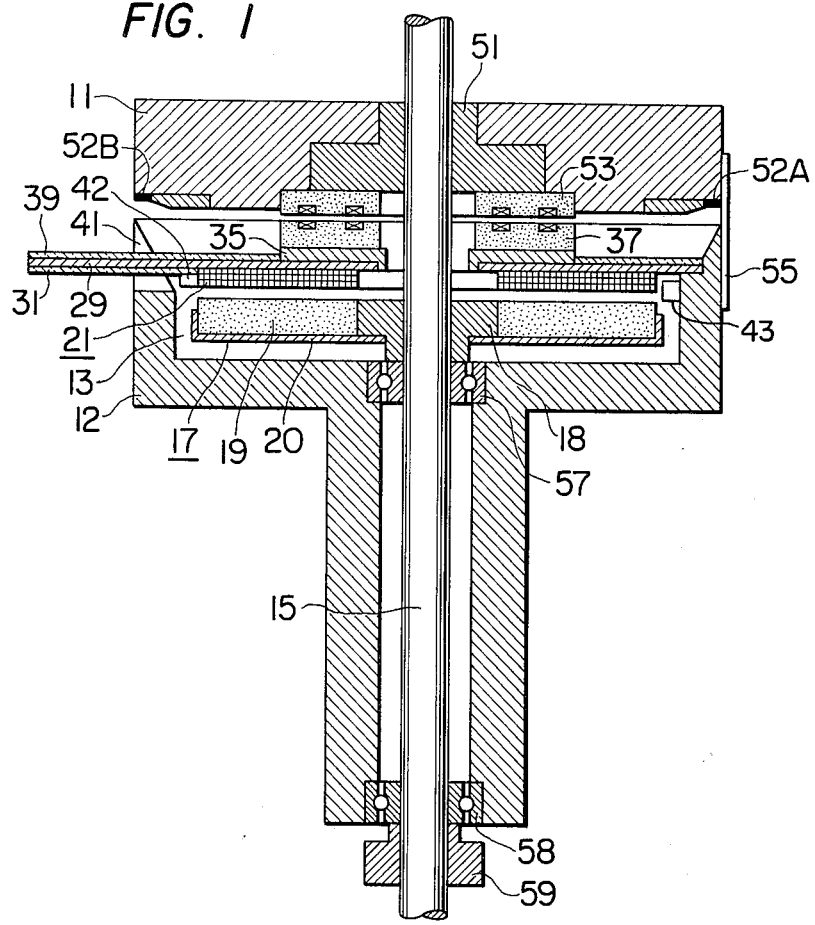
FIG. 1 is a longitudinal sectional through the axis of a slotless, brushless motor mounted in a drum.

FIG. 1 shows a slotless, brushless motor received in a rotary drum of a video tape recorder, for example. The motor is disposed in a space 13 formed by a rotatory drum 11 and stationary drum 12. A shaft 15 is disposed so as to pass through the space 13 and a permanent magnet rotor 17 is fixed to the shaft 15. The permanent magnet rotor 17 comprises a permanent magnet 19 in the form of a flat plate, a member 20 supporting the permanent magnet 19 and a hub 18 installed between the shaft 15 and the permanent magnet 19 and mounted on the permanent magnet 19. An armature coil 21 is disposed in opposition to the permanent magnet rotor 17.

Figure 3:
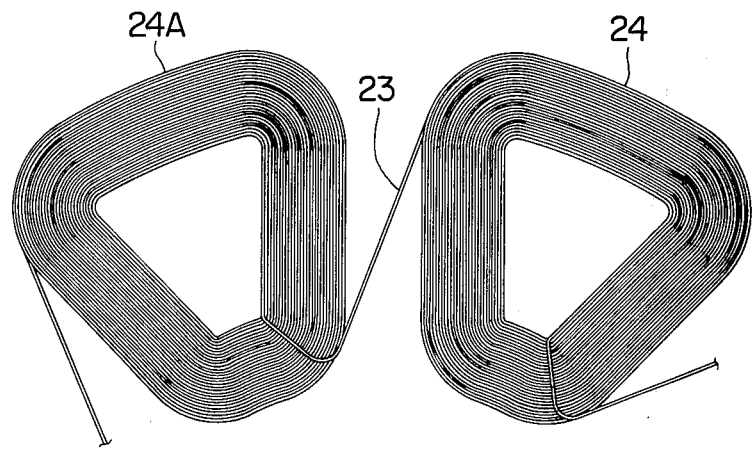
FIG. 3 is a view of the coil portions used in the motor of FIG. 1.
Figure 2:
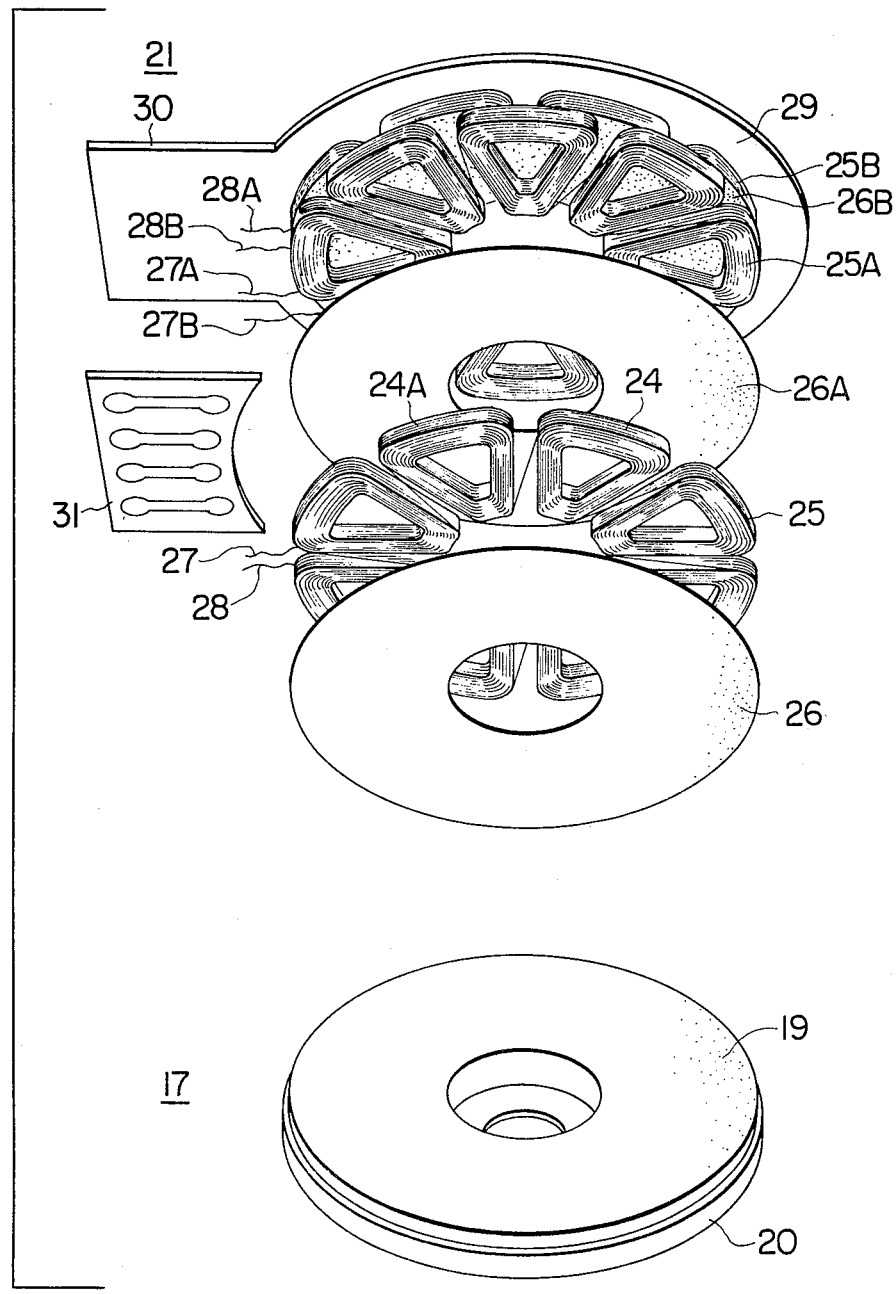
FIG. 2 is an exploded view illustrating parts of a motor in accordance with the present invention.

As seen in FIGS. 2 and 3, a conductor 23, such as an enamel wire (for example, a self-melting and adhering conductor) is concentrically wound in a plane so that a coil portion 24 is formed. The coil portion comprises a circular arc outer portion, two side portions in an arcuate angle and an inner portion arranged between the side portions. After forming one coil portion, an adjacent coil portion 24A is concentrically wound in sequence from the former coil portion 24. In such a way, eight coil portions are continuously formed forming one coil, as seen in FIG. 2. Thus, the permanent magnet is magnetized in eight poles and an armature coil with eight poles in one phase is formed.

Two terminals 27 and 28 are taken out from one coil. In order to make a three-phase motor, three coils 25, 25A, 25B are disposed in such a way that each phase differs by 120°. Prepreg sheets 26, 26A, and 26B, such as a reinforced plastic containing or combined with the full complement of resin before molding, are disposed on the coil 25 and between the coils 25, 25A, and 25B. A yoke iron plate 29 having a circular disk portion and a supporting portion 30 is disposed on another side of the coil 25B.

The coils 25, 25A, and 25B, prepreg sheets 26, 26A, and 26B and the yoke iron plate 29 are laid on or piled upon one another in turn and under this condition, heat is added under pressure. Through a heat treatment these parts are integrated and mounted on the yoke iron plate. Thus, each coil is electrically insulated and at the same time the phase relationship between coils is accurately fixed.

Also, since the stator of the armature coil is formed through a heat adherence treatment under pressure, the surface is made flatter and the horizontal length of the coil is made shorter. In the exemplary embodiment, it is possible to employ not only a prepreg sheet but also an adhesive sheet.

A terminal plate 31 is mounted on the supporting portion 30 of the yoke iron plate 29. The terminals 27, 28, 27A, 27B, 28A and 28B are connected to predetermined positions on the terminal plate 31.

As shown in FIG. 1, a stationary transducer 37 is mounted on another side surface of the yoke iron plate 29 through a supporting member 35. A terminal plate 39 is further mounted on the surface of the yoke iron plate 29 and terminals from the statonary transducer 37 are connected to the terminal plate 39. A port of the terminal plates 31 and 39 are taken out from a notch 41 formed at the upper portion of the statonary drum 12.

In such a way the armature coil 21, the stationary transducer 37 and the terminal plates 31 and 39 are made integral and are mounted on a supporting portion 42 of the stationary drum 12. A position-detecting element 43, for example, a hall element, is fixedly installed for detecting the position of the permanent magnet rotor 17 on an inner surface of the stationary drum 12 in the space 13.

The rotary drum 11 is fixed to the shaft 15 through a supporting member 51. Two video heads 52A, 52B and a rotary transducer 53 at a rotatory side are installed on the rotatory drum 11. The numeral 55 is a video tape.

Two bearings 57 and 58 are installed between the shaft 15 and the stationary drum 12 and a bearing supporter 59 is installed to support the bearing 58.

The motor for driving the rotary drum 11 is a flat, slotless, brushless motor disposed in the statinary drum 12. As above described, the motor utilizes the yoke iron plate 29 as one part of a magnetic circuit and is provided with the flat armature coil 21 mounted on the yoke iron plate 29 and with the permanent magnet rotor 17 fixed to the shaft 15.

Each coil comprises a plurality of coil portions and N coils are laid on each other in different phase positions. In a case of three phases, N is equal to three.

Adhesive sheets are disposed between the coils, and the coils and the adhesive sheets are made integral by means of a heat-adherence treatment under pressure. Thus, a flat armature coil of N phases is produced.

In the embodiment, although a motor received in a drum of a VTR has been explained by way of example, the motor is usable not only for a VTR, but also for other devices.

While we have shown and described an embodiment in accordance with the present invention, it is understood that the same is not limited thereto but is susceptible of numerous changes and modifications as known to those of skill in the art and we therefore do not wish to be limited to the details shown and described herein but intend to cover all such changes and modifications as are obvious to those skilled in the art.

What is claimed is:

1. A slotless and brushless motor provided with a shaft mounted for rotation, a permanent magnet rotor integrally rotating with the shaft, a stator of armature including coils each of which consists of a plurality of concentrically wound coil portions formed in sequence and disposed opposite the permanent magnet rotor, and a supporting member for supporting the stator, wherein the stator comprises three coils each phase of which differs by 120°, the coils are disposed adjacent each other in spaced parallel planes, each coil consists of eight coil portions and is provided with two terminals; a prepreg or adhesive sheet is respectively disposed between said three coils; and, each of the coil portions is made from a self-melting and adhering conductor.

2. A slotless, brushless motor of claim 1, wherein three coils are laid on each other.

3. A slotless, brushless motor of claim 1, wherein the coil comprises eight coil portions and eight poles.

4. A slotless, brushless motor of claim 1, wherein the coils are made integral by means of a heat-adherence treatment under pressure.

5. A slotless and brushless motor provided with a shaft mounted for rotation, a permanent magnet rotor integrally rotating with the shaft, a stator of armature including coils each of which consists of a plurality of concentrically wound coil portions formed in sequence and disposed opposite the permanent magnet rotor, and a supporting member for supporting the stator, wherein the stator comprises groups of coils different in a phase respectively, the groups are disposed adjacent each other in spaced parallel planes, a prepreg or adhesive sheet is respectively disposed between said groups of coils, and each of the coil portions is made from a self-melting and adhering conductor.

6. A slotless, brushless motor of claim 5, wherein each coil portion comprises a circular arc outer portion, two side portions in an acute angle and an inner portion arranged between the side portions.

7. A slotless, brushless motor of claim 5, wherein said supporting means is a yoke iron plate forming one part of a magnetic circuit.

8. A slotless, brushless motor of claim 7, wherein the yoke iron plate comprises a circular disk and a supporting portion on which a terminal plate for connecting terminals from each coil is mounted.

9. A slotless, brushless motor of claim 5, wherein the coils and the sheets are made integral by means of a heat-adherence treatment under pressure.

10. A slotless, brushless motor of claim 5, wherein the permanent magnet rotor comprises a single flat magnet is the shape of a disc.

11. A slotless brushless motor comprising a shaft mounted for rotation, a permanent magnet rotor fixed to the shaft, an integral stator of armature, and means for supporting the integral stator; wherein the integral stator comprises coils for forming separate phases having concentrically and sequentially wound coil portions arranged in a plane, and adhesive sheets means for fixing the coils parallel to one another, thereby providing the integral stator.

12. A slotless and brushless motor as set forth in claim 11, wherein the coils comprise a self-melting and adhering conductor for fixing the coils parallel to one another.

* * * * *